US012375291B2

(12) United States Patent
Credico, Jr. et al.

(10) Patent No.: US 12,375,291 B2
(45) Date of Patent: Jul. 29, 2025

(54) CRYPTOGRAPHIC ARCHITECTURE FOR SECURING ACCESS TO CONTROLLED SUBSTANCES

(71) Applicant: Express Scripts Strategic Development, Inc., St. Louis, MO (US)

(72) Inventors: Joseph E. Credico, Jr., Whippany, NJ (US); Shashikanth Sathyanarayana Nelakanti, O'Fallon, MO (US); Roman Y. Geytsman, Wayne, NJ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 244 days.

(21) Appl. No.: 17/941,800

(22) Filed: Sep. 9, 2022

(65) Prior Publication Data
US 2024/0089116 A1    Mar. 14, 2024

(51) Int. Cl.
*H04L 9/32*    (2006.01)
*G06F 21/60*   (2013.01)

(52) U.S. Cl.
CPC .......... *H04L 9/3247* (2013.01); *G06F 21/602* (2013.01); *H04L 9/3213* (2013.01); *H04L 9/3239* (2013.01)

(58) Field of Classification Search
CPC ... H04L 9/3247; H04L 9/3213; H04L 9/3239; G06F 21/602
See application file for complete search history.

(56) References Cited

U.S. PATENT DOCUMENTS

| 5,661,805 A | 8/1997 | Miyauchi |
| 6,848,048 B1 | 1/2005 | Holmes |
| 7,120,799 B2 | 10/2006 | Leung |

(Continued)

FOREIGN PATENT DOCUMENTS

WO    2022103380 A1    5/2022

OTHER PUBLICATIONS

Payer Specifications D.0, New York State Department of Health, Sep. 21, 2020 [retrieved on Jun. 6, 2024], Retrieved from the Internet: <URL: https://www.health.ny.gov/health_care /epic/pharmacy_prescriber/provider_payer_specifications_2020-09.htm> (Year: 2020).*

*Primary Examiner* — Carl G Colin
*Assistant Examiner* — Zhe Liu
(74) *Attorney, Agent, or Firm* — Miller Johnson

(57) ABSTRACT

A cryptographic protection system includes memory hardware configured to store instructions and processing hardware configured to execute the instructions stored by the memory hardware. The instructions include receiving a data package via a networked communications channel. The instructions include, in response to the data package satisfying first criteria, transforming the data package into a transformed package according to transformation rules. The transforming includes identifying a plurality of data elements in the data package as specified by the transformation rules and inserting each of the plurality of data elements into the transformed package. The instructions include executing a cryptographic hash on the transformed package to generate a cryptographic digest. The instructions include obtaining a cryptographic signature based on the cryptographic digest. The instructions include storing the cryptographic signature into a data store.

20 Claims, 13 Drawing Sheets

(56) References Cited

U.S. PATENT DOCUMENTS

| | | |
|---|---|---|
| 7,512,786 B2 | 3/2009 | England |
| 7,627,765 B2 | 12/2009 | Nakamura |
| 8,041,957 B2 | 10/2011 | Michaelis |
| 8,301,894 B2 | 10/2012 | Malkin |
| 9,443,091 B2 | 9/2016 | Emmett |
| 9,547,657 B2 | 1/2017 | Weinstein |
| 9,853,974 B2 | 12/2017 | Hampel |
| 9,867,043 B2 | 1/2018 | Aissi |
| 10,230,529 B2 | 3/2019 | Costa |
| 10,777,309 B1 | 9/2020 | Joshi |
| 11,450,419 B1 * | 9/2022 | Esman ............... G16H 20/13 |
| 11,756,104 B1 * | 9/2023 | Hopkins ............ G06Q 30/0603 |
| | | 705/26.82 |
| 2004/0019502 A1 * | 1/2004 | Leaman ............... G16H 10/60 |
| | | 705/2 |
| 2006/0259330 A1 * | 11/2006 | Schranz ............... G16H 20/10 |
| | | 235/487 |
| 2008/0112615 A1 * | 5/2008 | Obrea ................. G16H 20/10 |
| | | 382/175 |
| 2008/0133925 A1 | 6/2008 | Abe |
| 2013/0036057 A1 | 2/2013 | Hendrix |
| 2014/0283089 A1 * | 9/2014 | Arya .................. G06F 21/6245 |
| | | 726/26 |
| 2015/0154403 A1 * | 6/2015 | Dornbush ............ G16H 20/30 |
| | | 700/91 |
| 2017/0083867 A1 * | 3/2017 | Saxena ................ G06Q 10/103 |
| 2017/0141924 A1 * | 5/2017 | Ryu .................... H04L 9/3236 |
| 2018/0089434 A1 * | 3/2018 | Sibert ................ H04L 63/0853 |
| 2018/0316505 A1 * | 11/2018 | Cohen ................ G16H 10/60 |
| 2019/0303623 A1 | 10/2019 | Reddy |
| 2020/0333770 A1 * | 10/2020 | Schulz ............. G05B 19/41885 |
| 2022/0121689 A1 * | 4/2022 | James ............... G06F 16/24568 |

\* cited by examiner

CRYPTOGRAPHIC ARCHITECTURE FOR SECURING ACCESS TO CONTROLLED SUBSTANCES

FIELD

The present disclosure relates to applied cryptography and more particularly to generation and validation of cryptographic signatures.

SUMMARY

A cryptographic protection system includes memory hardware configured to store instructions and processing hardware configured to execute the instructions stored by the memory hardware. The instructions include receiving a data package via a networked communications channel. The instructions include, in response to the data package satisfying first criteria, transforming the data package into a transformed package according to transformation rules. The transforming includes identifying a plurality of data elements in the data package as specified by the transformation rules and inserting each of the plurality of data elements into the transformed package. The instructions include executing a cryptographic hash on the transformed package to generate a cryptographic digest. The instructions include obtaining a cryptographic signature based on the cryptographic digest. The instructions include storing the cryptographic signature into a data store.

In other features, the first criteria include that the data package is identified by a type that is one of an enumerated set of types. In other features, the enumerated set of types includes a new prescription type, a renewal response type, a denied response type, and a change response type. In other features, the transformation rules are dependent on the type of the data package. In other features, the transforming includes converting every character of the transformed package into a defined set of characters. In other features, the storing includes storing the data package into the data store. In other features, obtaining the cryptographic signature includes requesting temporary credentials and transmitting a signature request to a cryptographic signature system. The signature request includes the temporary credentials and the cryptographic digest.

In other features, the cryptographic protection system is operated by a first party and the cryptographic signature system is operated by a third party. In other features, obtaining the cryptographic signature includes obtaining first credentials from an identity provider system operated by the first party and presenting the first credentials to a security token service operated by the third party to obtain the temporary credentials. In other features, obtaining the cryptographic signature includes, in response to unresponsiveness of the cryptographic signature system, transmitting a second signature request to a second cryptographic signature system. In other features, the first criteria include that the data package includes information indicating a controlled substance. In other features, the transforming includes, for each data element, selectively applying a transformation to the data element according to the transformation rules.

A method of operating a cryptographic protection system includes receiving a data package via a networked communications channel. The method includes, in response to the data package satisfying first criteria, transforming the data package into a transformed package according to transformation rules. The transforming includes identifying a plurality of data elements in the data package as specified by the transformation rules and inserting each of the plurality of data elements into the transformed package. The method includes executing a cryptographic hash on the transformed package to generate a cryptographic digest. The method includes obtaining a cryptographic signature based on the cryptographic digest. The method includes storing the cryptographic signature into a data store.

In other features, the first criteria include that the data package is identified by a type that is one of an enumerated set of types. In other features, the transformation rules are dependent on the type of the data package. In other features, the transforming includes converting every character of the transformed package into a defined set of characters. In other features, obtaining the cryptographic signature includes requesting temporary credentials and transmitting a signature request to a cryptographic signature system. The signature request includes the temporary credentials and the cryptographic digest.

In other features, the cryptographic protection system is operated by a first party and the cryptographic signature system is operated by a third party. Obtaining the cryptographic signature includes obtaining first credentials from an identity provider system operated by the first party and presenting the first credentials to a security token service operated by the third party to obtain the temporary credentials. In other features, the transforming includes, for each data element, selectively applying a transformation to the data element according to the transformation rules.

A non-transitory computer-readable medium includes instructions. The instructions include receiving a data package via a networked communications channel. The instructions include, in response to the data package satisfying first criteria, transforming the data package into a transformed package according to transformation rules. The transforming includes identifying a plurality of data elements in the data package as specified by the transformation rules and inserting each of the plurality of data elements into the transformed package. The instructions include executing a cryptographic hash on the transformed package to generate a cryptographic digest. The instructions include obtaining a cryptographic signature based on the cryptographic digest. The instructions include storing the cryptographic signature into a data store.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
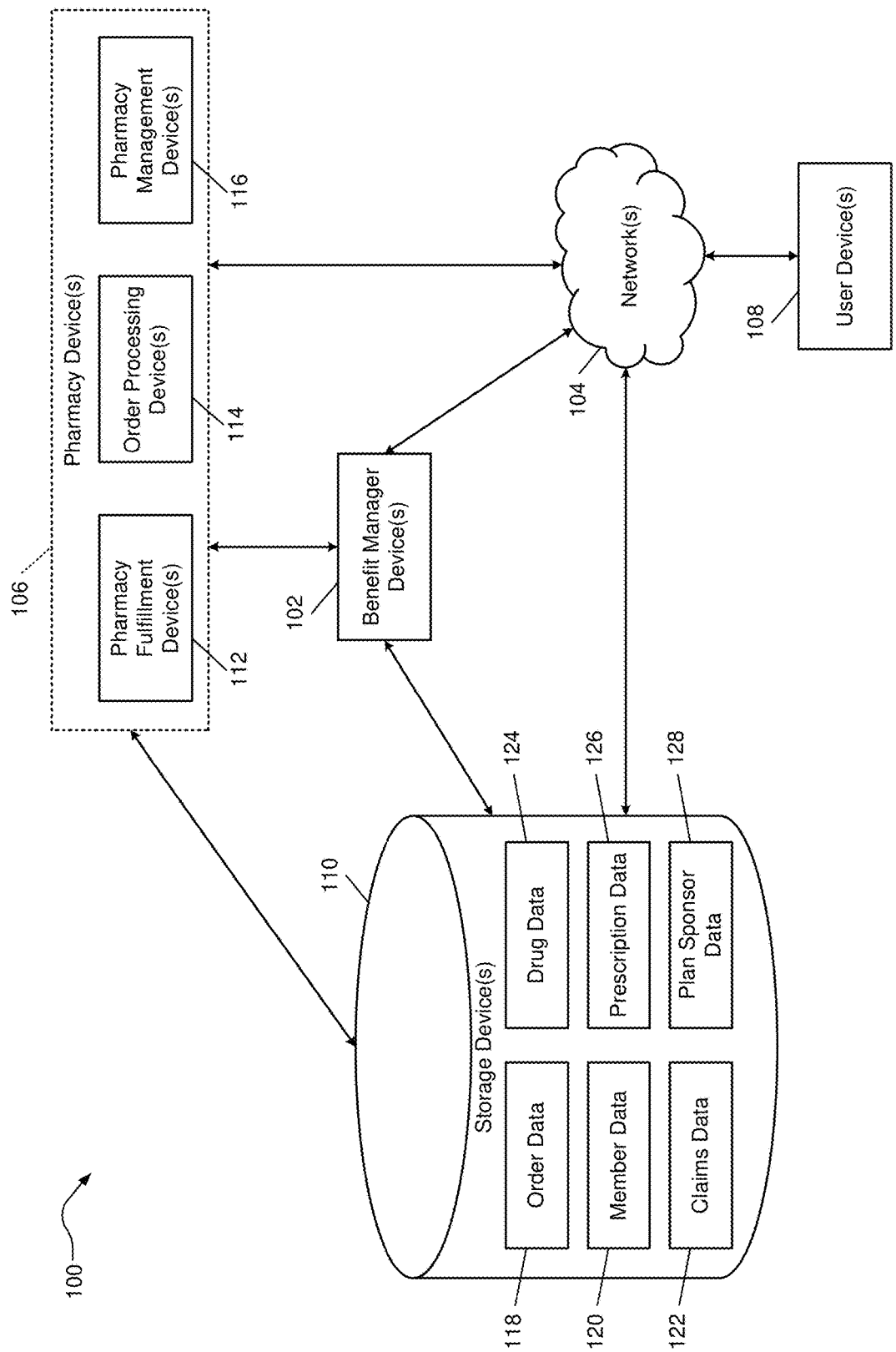
FIG. 1 is a functional block diagram of an example system including a high-volume pharmacy.

When prescription information is exchanged, there is a need to protect that information from being changed inadvertently or by tampering. One mechanism for preventing and detecting changes is cryptographic signatures. Especially when the prescription relates to controlled substances, various regulations and best practices may dictate features of the cryptographic process. For example, in the United States, federal and state laws and regulations from entities such as the Drug Enforcement Administration (DEA) and the National Institute of Standards and Technology (NIST) may specify parameters of the cryptographic process. For example, there may be a requirement that cryptographic signatures meet a standard such as the FIPS 140-2 standard. In various implementations, this standard may require specialized hardware, such as a hardware security module.

When relying on third party provision of cryptographic hardware and software, a data controller needing a cryptographic signature may be concerned about transmitting sensitive information to the third party. For example, the information may include protected health information (PHI) and personally identifiable information (PII). In various implementations, there may be rules, regulations, internal policies, best practices, etc. specifying that some or all PHI or PII cannot be transmitted to a third party. The protected information may also relate to parties to or content of a transaction, a contract or the like.

The present disclosure describes encoding prescription information using a one-way function to produce an output that could be shared with the third party. A cryptographic one-way function means that the output cannot be deciphered to reveal the input (prescription information, PHI, PII or the like). A cryptographic hash possesses this one-way attribute. As a result, a cryptographic hash of prescription information can be provided to a third party that cryptographically signs the hash and returns the signature without any risk that the third party will have access to the input data.

This signature may be stored along with the original record—e.g., a prescription record—in a database or other data structure. The integrity of the prescription information can then be checked by validating the signature, such as on a regular basis and/or in response to an audit. In various implementations, the prescription and signature may be stored in a database with strong auditing features that create evidence of when the signature was saved into the database, where the signature was created, or both. These audit features may prevent the later modification of the original record (e.g., the prescription information record) and the generation of a corresponding signature based on any modified record (e.g., the prescription information record).

In order to create an input to the cryptographic hash function, a set of transformation rules may be defined to convert prescription information into a serialized data structure in a deterministic and repeatable manner. This allows the hash to be repeatably recalculated from the prescription data so that the signature of the hash can be validated.

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc. Such a user may provide prescription information to generate a prescription information record that may require a cryptographic signature. A prescription information record can be stored in memory of an electronic device.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102. The benefit manager device 102 may flag a prescription information record as requiring a cryptographic signature.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations. The adjudication function may flag a prescription information record, based in part on the prescription information, as requiring a cryptographic signature.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

Some or all of the foregoing operations may be performed by executing instructions stored in the benefit manager device 102 and/or an additional device. In an example, when a cryptographic signature is required, then the adjudication is approved but filling of the prescription, delivery of the prescription, reimbursement, payment, or any combination thereof, may be paused until the cryptographic signature is generated and associated or stored in the electronic record for the particular prescription.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts, LLC of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
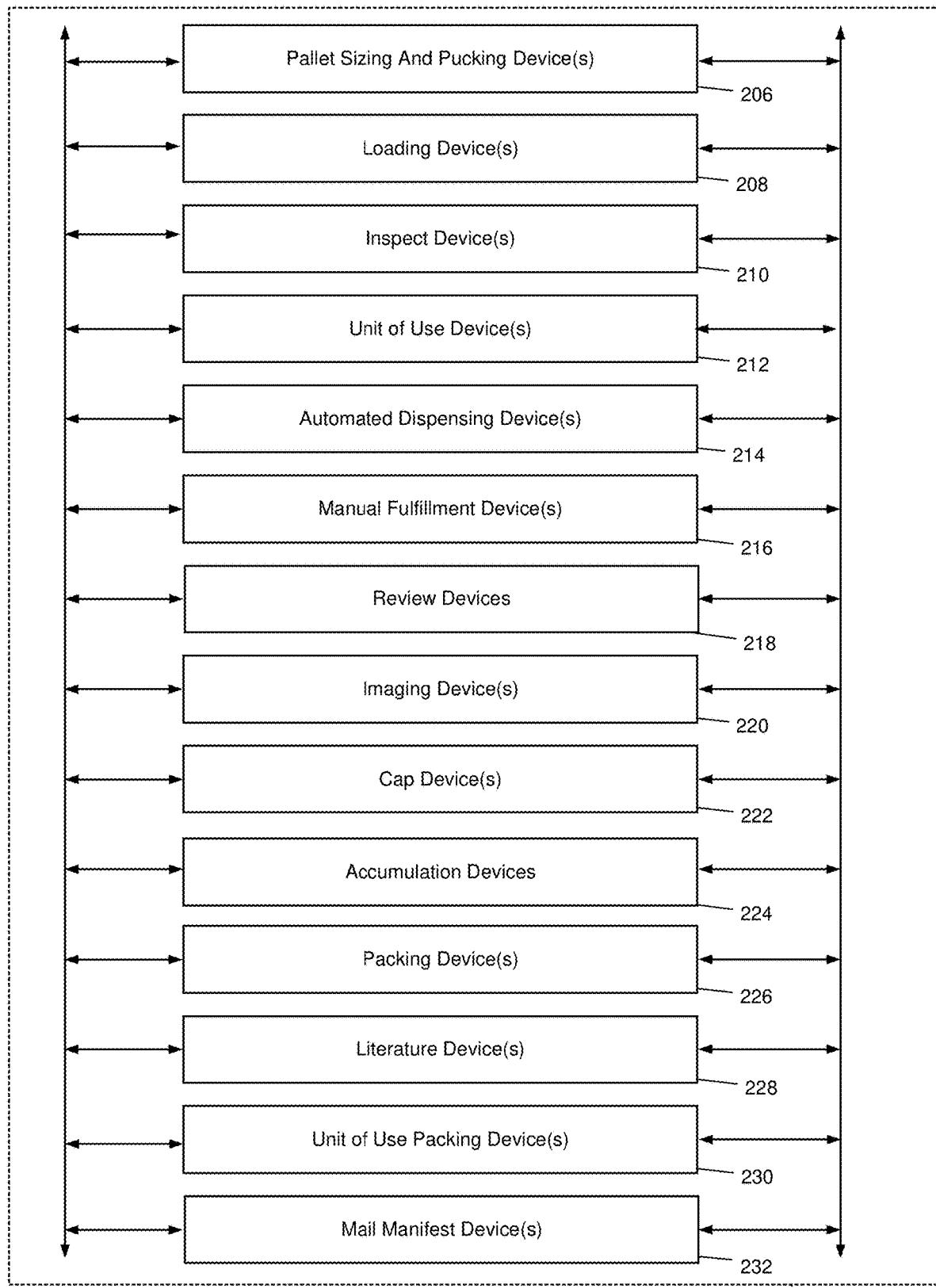
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
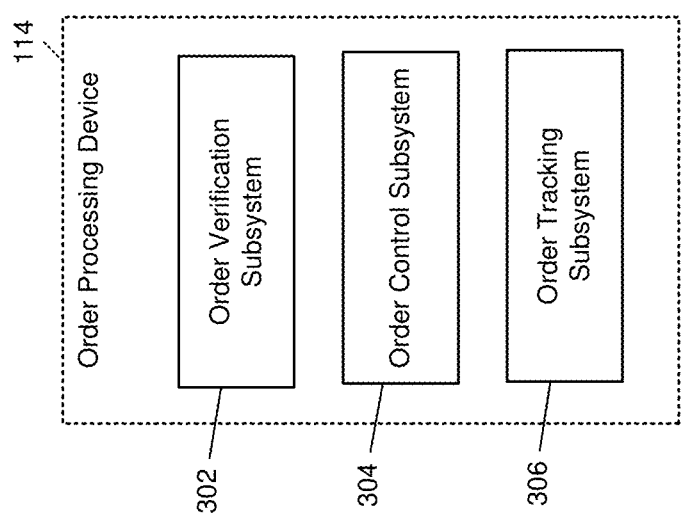
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. In an example, the instructions to fulfill an order that contains a controlled substance may be withheld from the order processing device until the cryptographic signature for such an order is received. In an example embodiment, the order processing device 114 receives an order containing a controlled substance and may wait to begin processing the order until a certain step or time. If the cryptographic signature is not received by the deadline of the step or the time, the order if removed from the batch of orders to be fulfilled. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes. The benefit manager device 102 may be in communication with the cryptographic signature systems to retrieve the cryptographic signature, to coordinate validation of the cryptographic signature, and to release the prescription for fulfillment.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. In an example, the orders with a controlled substance requiring a cryptographic signature are batched together by the order control subsystem 304. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Block Diagrams

Figure 4:
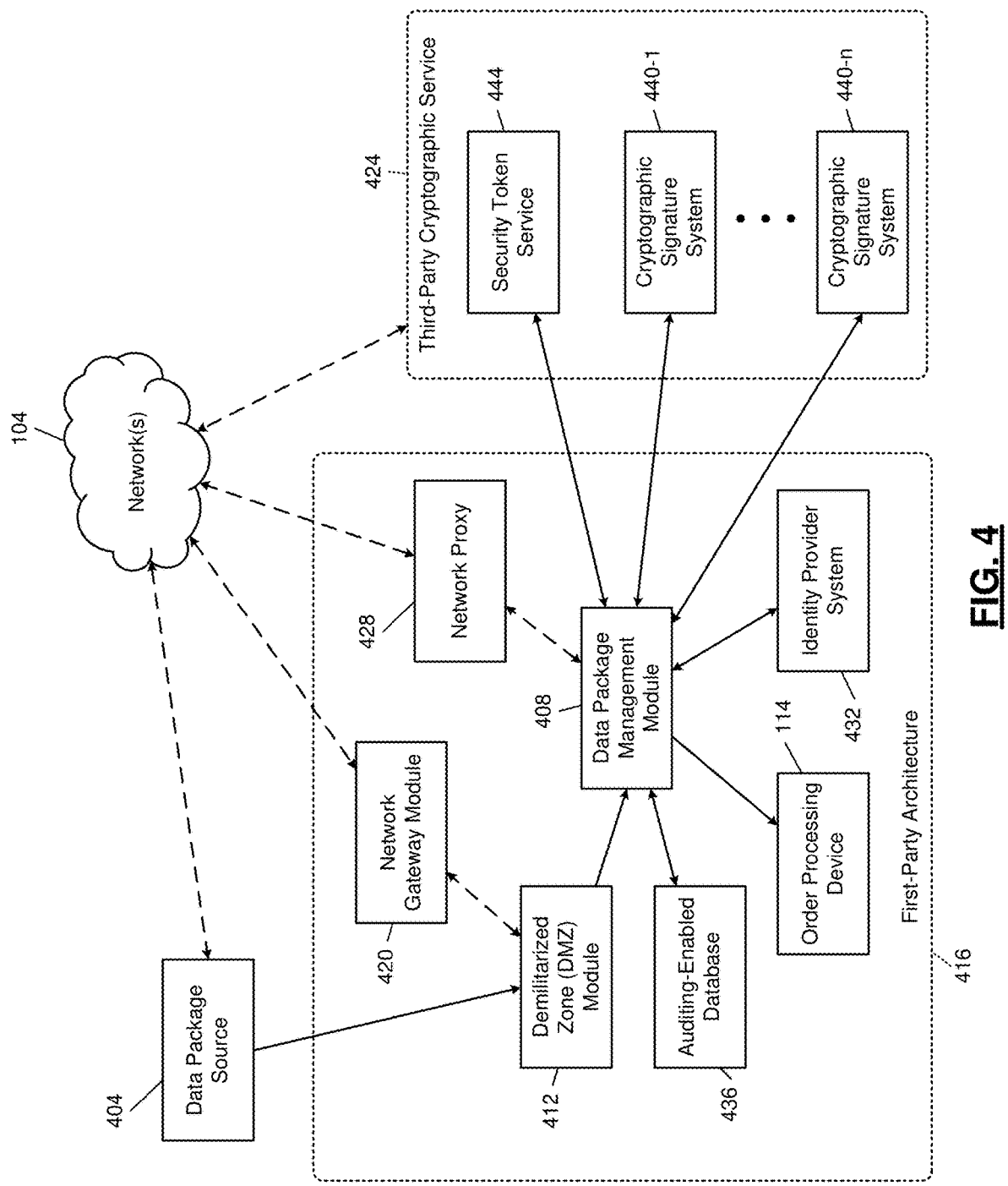
FIG. 4 is a functional block diagram of an example architecture according to the principles of the present disclosure.

In FIG. 4, an example implementation is graphically depicted. A data package source 404 provides data packages to a data package management module 408 via a networked communications channel (which may sometimes or always rely on transport through the networks 104). This provision may be conducted through a demilitarized zone (DMZ) module 412. Each data package may correspond to a single prescription. In various implementations, the data package source 404 may be operated by Surescripts, LLC.

In the example of FIG. 4, a first operator administers first-party architecture 416. The first-party architecture 416 may be implemented using hardware owned by, leased by, or accessed by the first party. Other examples than those shown in FIG. 4 are within the scope of the present disclosure. For example, elements shown for illustration as part of the first-party architecture 416 may actually be implemented by a third party. Similarly, elements described as being operated by a third party may in some cases be included as part of the first-party architecture 416. Further, some elements may be operated by one third party while other elements are operated by a different third party.

In FIG. 4, the demilitarized zone (DMZ) module 412 logically operates within the network DMZ of the first-party architecture 416. The DMZ may be created by network apparatuses such as a gateway or edge router. The DMZ module 412 facilitates communication between protected elements of the first party architecture 416 and outside elements, such as those accessed via the internet. As an example, a network gateway module 420 may create the DMZ and, in various implementations, may host the DMZ module 412. In other implementations, the network gateway module 420 routes data to the DMZ module 412 operating within another device.

In FIG. 4, solid lines show, in general terms, functional flows of data while dash lines show actual connections. For example, the data package source 404 may not communicate directly with the DMZ module 412. Instead, the data package source 404 may communicate with the networks 104, which are in communication with the network gateway module 420, which in turn routes external data to the DMZ module 412. Similarly, the data package management module 408 communicates with elements of a third-party cryptographic service 424. However, this communication may not be direct. Instead, the data package management module 408 may rely on a network proxy 428 to communicate with the third-party cryptographic service 424 via the networks 104.

Figure 5:
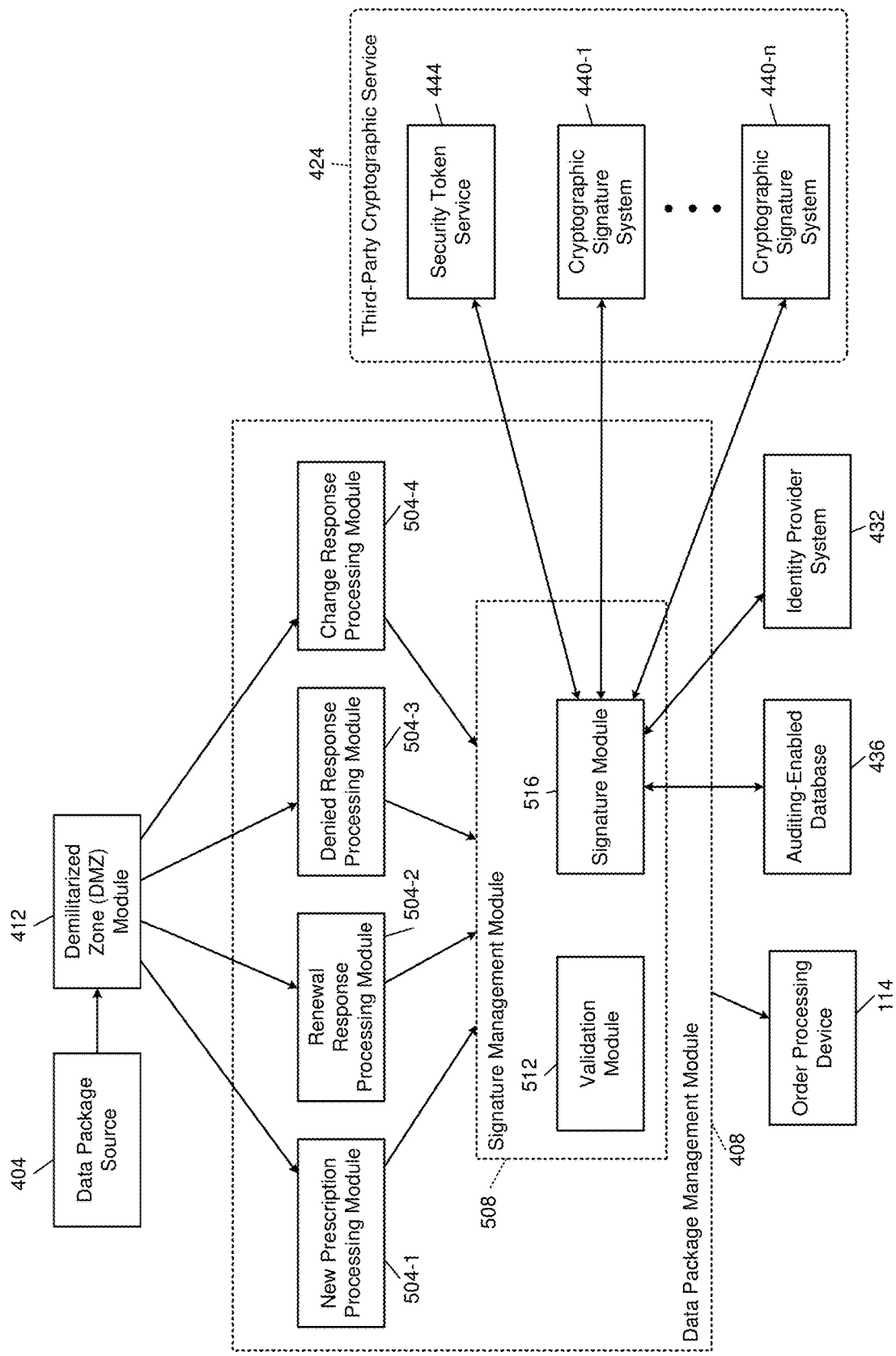
FIG. 5 is a functional block diagram of an example implementation of the data package management module of FIG. 4.

The DMZ module 412 provides data packages to the data package management module 408 and, in various implementations, may route data packages to specific targets within the data package management module 408. More details of this process are shown in FIG. 5. The data package management module 408 may interface with an identity provider system 432. In various implementations, the identity provider system 432 may provide credentials to the data package management module 408 for accessing the third-party cryptographic service 424.

The data package management module 408 may provide prescription information to the order processing device 114, which may eventually lead to fulfillment of a prescription. In various implementations, the data package management module 408 may only provide prescriptions to the order processing device 114 when the cryptographic signature corresponding to the prescription is successfully validated.

Prescription data and cryptographic signatures are stored into an auditing-enabled database 436 by the data package management module 408. The database 436 may have auditing features enabled to reliably and verifiably track when signatures are stored. The database 436 may be a relational database, a NoSQL database, etc. In various implementations, the database 436 may be replaced by a column store or other data storage system, such as an append-only log, a blockchain, etc.

The data package management module 408 may rely on a cryptographic signature system 440-1 to generate cryptographic signatures. In various implementations, the data package management module 408 may communicate with multiple cryptographic signature systems. Illustrated in FIG. 4 is a cryptographic signature system 440-n, where "n" is an integer greater than or equal to 2. For example, multiple cryptographic graphic signature systems may be used to ensure high availability. For example, the cryptographic signature systems 440-1 through 440-n (collectively, cryptographic signature systems 440) may correspond to different regions of a cloud provider.

The data package management module 408, or another entity within the first-party architecture 416, may be responsible for instructing the cryptographic signature systems 440 to generate public-private key pairs for the data package management module 408. The private keys may then be retained within the cryptographic signature systems 440 and, in various implementations, never provided to the first-party architecture 416.

In order to access the cryptographic signature systems 440, the data package management module 408 may need to present credentials from the identity provider system 432 to a security token service 444, which may be administered by the third-party cryptographic service 424. The security token service 444 may provide temporary credentials to the data package management module 408, which the data package management module 408 can present to one or more of the cryptographic signature systems 440.

FIG. 5 is an example implementation of the data package management module 408. In this particular example, the DMZ module 412 may provide a data package to one of multiple processing modules depending on the type of data package. For example, the data package management module 408 may include a new prescription processing module 504-1, a renewal response processing module 504-2, a denied response processing module 504-3, and a change response processing module 504-4 (collectively, processing modules 504). In various implementations, the processing modules 504 may correspond to an enumerated set of types of data packages—as a result, there may be more or fewer of the processing modules 504 depending on the types of data packages to be processed.

The DMZ module 412 may select one of the processing modules 504 based on a type of the data package, which may be indicated by type identifier within the data package. If the type identifier does not match one of the processing modules 504, the data package may be dropped. In various implementations, an error message or non-acknowledgment may be transmitted to the data package source 404 indicating that the data package will not be accepted.

The processing modules 504 communicate with a signature management module 508. The signature management module 508 includes a validation module 512 to validate signatures provided within the data package and/or signatures already generated by a signature module 516. The signature module 516 may be responsible for communicating with the third-party cryptographic service 424 and the identity provider system 432 and may store data package information and signatures into the auditing-enabled database 436.

In various implementations, once a signature has been validated by the signature management module 508, a respective one of the processing modules 504 may provide the data package to the order processing device 114.

Figure 6:
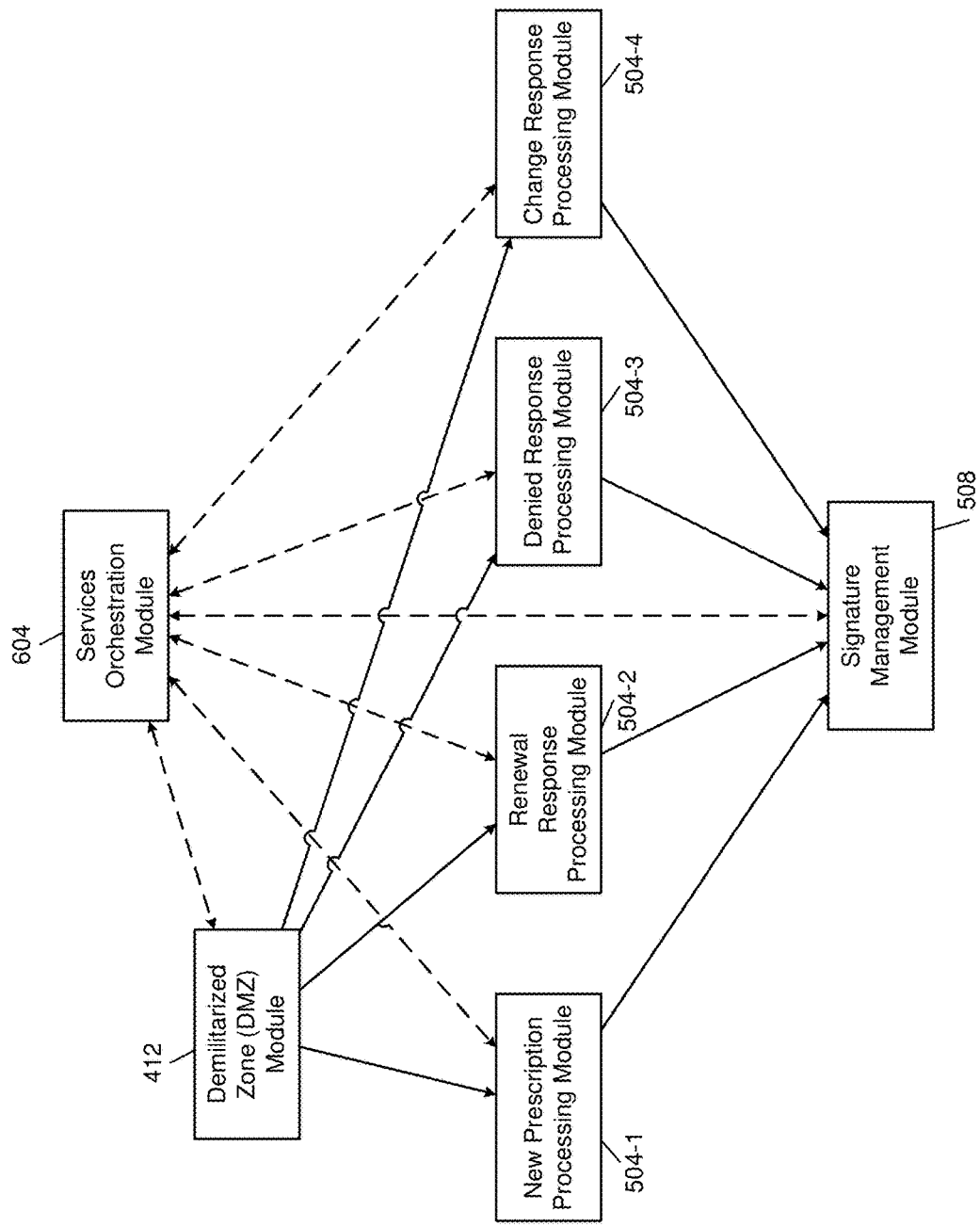
FIG. 6 is a functional block diagram of an example microservices implementation of components of the data package management module of FIG. 4.

In FIG. 6, a microservices implementation is illustrated in which the processing modules 504 are implemented as microservices. The DMZ module 412 and the signature management module 508 may also be implemented as microservices. The solid lines in FIG. 6 mirror those of FIG. 5 but, in a microservices implementation, each one of the microservices may be invoked using a services orchestration module 604. The dashed lines in FIG. 5 indicate that the functional communication depicted with the solid lines is actually performed via the services orchestration module 604. For example, in order to provide a data package to the new prescription processing module 504-1, the DMZ module 412 may invoke the new prescription processing module 504-1 by a call to the services orchestration module 604.

Figure 7:
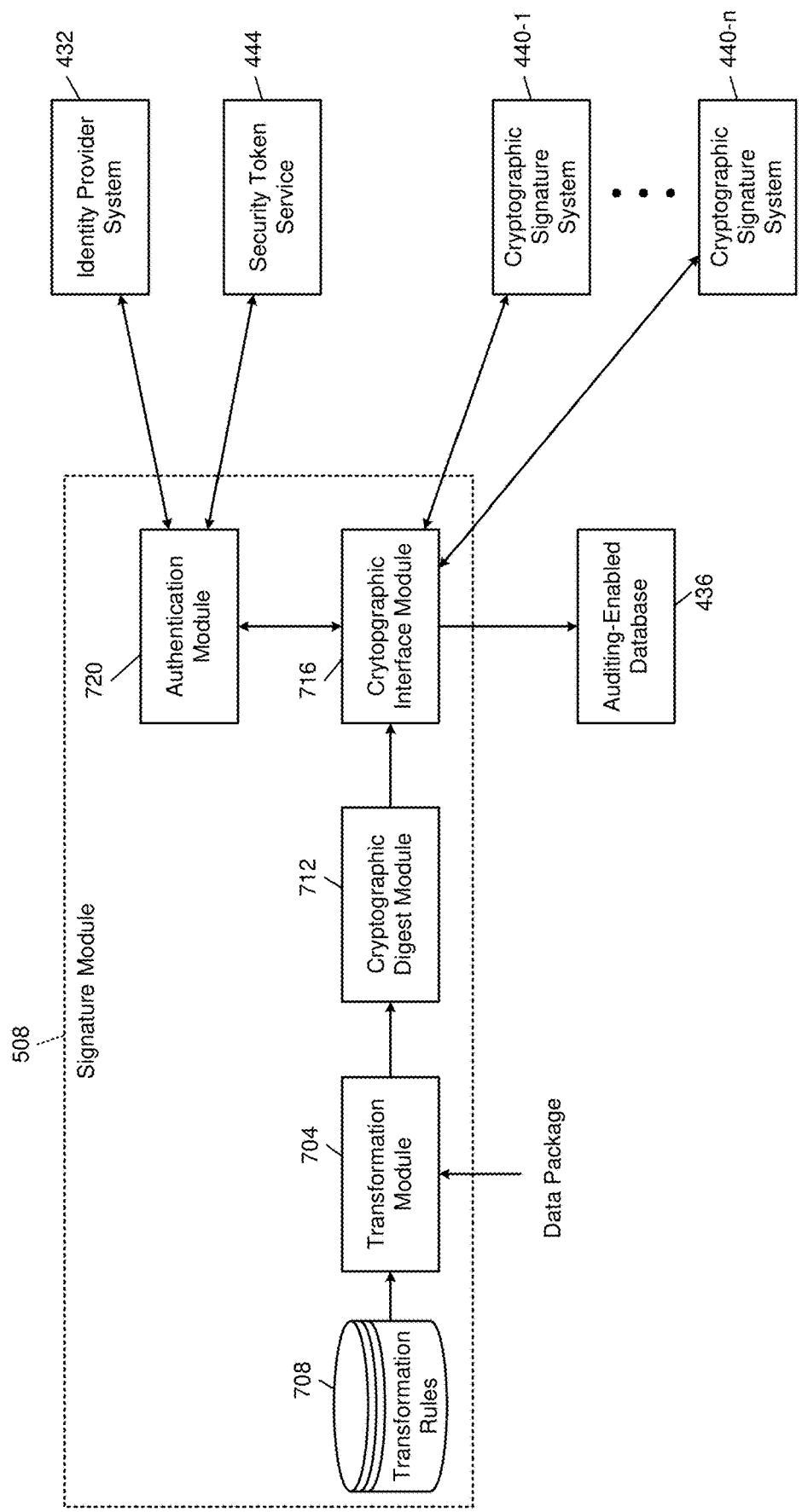
FIG. 7 is a functional block diagram of an example implementation of the signature module of FIG. 5.

In FIG. 7, an example implementation of the signature management module 508 includes a transformation module 704 that transforms a received data package according to rules specified by a transformation rules data source 708. For example, the transformation rules data source 708 may be a configuration file, such as a yet another markup language (YAML) file or an extensible stylesheet language transformations (XSLT) file. In various implementations, rather than being stored in the transformation rules data source 708, the transformation rules may be encoded into the transformation module, such as in source code written to implement the transformation module 704.

In various implementations, the transformation rules may be selected according to a type of the data package. For example, different transformation rules may apply to a new prescription data package compared to a renewal response data package. The transformation rules specify which fields from the data package to include in a transformed package and in what order to include them. The transformation rules may also specify data types, such as string lengths, bit depths, number type (such as integer or floating point), whether a number is signed or unsigned, etc.

The transformation rules may specify satisfaction criteria for some or all of the values. The satisfaction criteria may specify acceptable ranges, permissible character sets, etc. As one example, a transformation rule may specify an acceptable length in days of a prescription. For example, an upper bound of 120 and a lower bound of 1 may be specified.

In addition, the transformation rules may specify whether a default value can be substituted in the event of a value either missing from the data package or failing to satisfy the satisfaction criteria. As one example, if a value for whether refills are allowed is absent from the data package, a default value of false may be included in the transformed package.

In various implementations, the transformation rules may omit some or all of the satisfaction criteria, instead partially or fully relying on validation to be performed by another entity, such as the data package source 404 of FIG. 4—or, as another example, the processing modules 504 of FIG. 5.

As a result of applying the transformation rules, the transformation module 704 generates a transformed package, which is provided to a cryptographic digest module 712. The cryptographic digest module 712 calculates a cryptographic digest of the transformed package. For example, the cryptographic digest may be calculated using a SHA-2 (secure hash algorithm) library. As specific examples, the cryptographic digest module 712 may use SHA-256 or SHA-512 to calculate the cryptographic digest (also known as the cryptographic hash).

The cryptographic hash is provided to a cryptographic interface module 716, which communicates with the cryptographic signature systems 440 to obtain cryptographic signatures of the cryptographic hash. An authentication module 720 obtains temporary credentials using the identity provider system 432 and the security token service 444, which give the cryptographic interface module 716 the authority to obtain signatures from the cryptographic signature systems 440.

The cryptographic interface module 716 then stores the obtained signature for the transformed package into a database 436. In addition, the data package and/or the transformed package are stored in the database 436. Though possibly redundant, the cryptographic hash may also be stored into the database 436. The structure of the transformed package may be defined according to a serialization format such as JavaScript object notation (JSON). Another example format is extensible markup language (XML).

The transformation rules may define sections for the data elements that are encoded serially into the transformed package. One example of the sections and data elements is shown in the following table.

| Element Name <Prescriber> | Comment |
| --- | --- |
| DEA | <Identification><DEANumber> |
| SSN | <Identification><SocialSecurity> |
| Last Name | <LastName> |
| First Name | <FirstName> |
| Address Line 1 | <AddressLine1> |
| Address Line 2 | <AddressLine2> |
| City | <City> |
| Postal Code | <PostalCode> |
| <Patient> | |
| Last Name | <LastName> |
| First Name | <FirstName> |
| Address Line 1 | <AddressLine1> |
| Address Line 2 | <AddressLine2> |
| City | <City> |
| State | <StateProvince> |
| Postal Code | <PostalCode> |
| <MedicationPrescribed> or <MedicationResponse> | |
| Drug Name | <DrugDescription> |
| Drug Strength | <Strength><StrengthValue> |
| Quantity | <Quantity><Value> |
| Sig Text | <SigText> |
| Date Written (Date) | |
| Date Written - Year CCYY | <WrittenDate><Date> positions 1-4 |
| Date Written - Month MM | <WrittenDate><Date> positions 6-7 |
| Date Written - Day DD | <WrittenDate><Date> positions 9-10 |
| Date Written (DateTime) | |
| Date Written - Year CCYY | <WrittenDate><DateTime> positions 1-4 |
| Date Written - Month MM | <WrittenDate><DateTime> positions 6-7 |
| Date Written - Day DD | <WrittenDate><DateTime> positions 9-10 |
| <OtherMedicationDateQualifier> value of Effective Date (Date) | |
| Effective Date - Year CCYY (Earliest Fill Date) | <OtherMedicationDateQualifier> <EffectiveDate><Date> positions 1-4 |
| Effective Date - Month MM | <OtherMedicationDateQualifier> <EffectiveDate><Date> positions 6-7 |
| Effective Date -Day DD | <<OtherMedicationDateQualifier> EffectiveDate><Date> positions 9-10 |
| <OtherMedicationDateQualifier> value of Effective Date (DateTime) | |
| Effective Date - Year CCYY (Earliest Fill Date) | <OtherMedicationDateQualifier> <EffectiveDate><DateTime> positions 1-4 |
| Effective Date - Month MM | <OtherMedicationDateQualifier> <EffectiveDate><DateTime> positions 6-7 |

| Element Name <Prescriber> | Comment |
|---|---|
| Effective Date -Day DD | <OtherMedicationDateQualifier> <EffectiveDate><DateTime> positions 9-10 Refill Quantity |
| Refill Quantity Qualifier | "R" (hard-coded) |
| Number of Refills | <NumberOfRefills> |
| Notes | <Note> <MedicationPrescribed><Compound> or <MedicationResponse><Compound> |
| Drug Name | <CompoundIngredient><CompoundIngredientItemDescription> |
| Drug Strength | <CompoundIngredient><Strength><StrengthValue> |
| Quantity | <Compound><Quantity><Value> |

A first section contains metadata about the prescriber, a second section contains metadata about the patient, a third section contains data about the medication (whether in a prescription form or a response form), and a refill section describes information about permitted refills.

In addition, the data elements may specify elements such as notes and compound information for inclusion in the transformed package. The notes element may allow for the entry of freeform text comments, which may be directed to a pharmacist or a prescriber. These comments may be used to store a Drug Abuse Treatment Identifier and GHB reason. In various implementations, data elements, such as the "Refill Quantity Qualifier," may be set to a hard-coded static value, such as "R." The compound section (for Medication Prescribed or Medication Response) may be repeated as applicable for each ingredient in a compound. For example, the data elements may support up to 25 compound ingredients.

Figure 8:
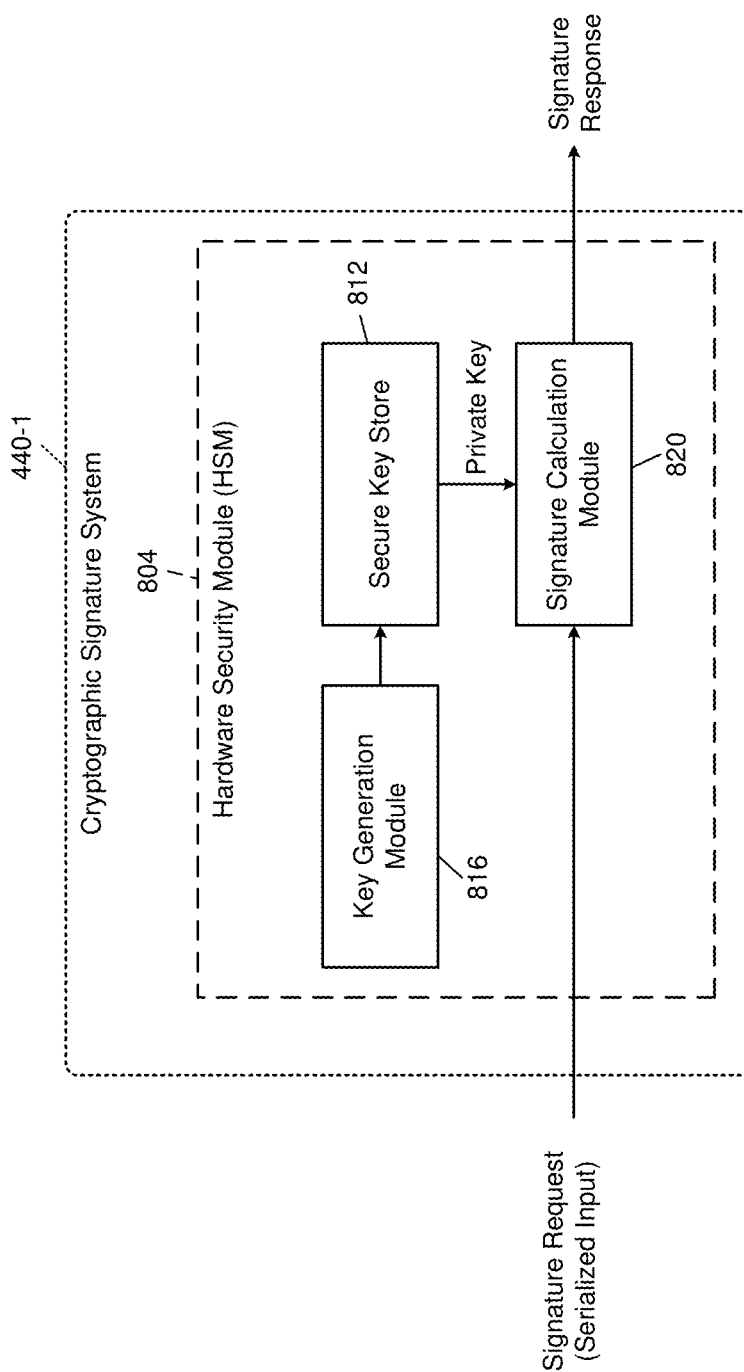
FIG. 8 is a functional block diagram of an example implementation of one of the cryptographic signature systems of FIG. 4.

In FIG. 8, an example implementation of the cryptographic signature system 440-1 includes a hardware security module (HSM) 804. The HSM 804 may be compliant with the federal information protection standard (FIPS) 140-2 from NIST. The HSM 804 includes a secure key store 812 that stores public and private keys generated for the first-party architecture 416 of FIG. 4. In various implementations, a key generation module 816 may be invoked by the first-party architecture 416 to produce one or more public-private key pairs for use by the HSM 804 on behalf of the first-party architecture 416. The public key may be returned to the first party architecture 416 while the private key remains within the secure key store 812.

When the signature request is received by a signature calculation module 820, the private key is obtained from the private key store 812 and used to encrypt serialized input from the signature request. The resulting encrypted value is provided in a signature response. In various implementations, the cryptographic signature system 440-1 and the security token service 444 may be hosted by a qualified provider, such as the key management service (KMS) offered by Amazon web services (AWS) from Amazon, Inc. The cryptographic signature systems 440 may be distributed among different regions of the AWS infrastructure, such as between geographic locations or between primary and backup regions.

Message Sequence Chart and Flowcharts

Figure 9:
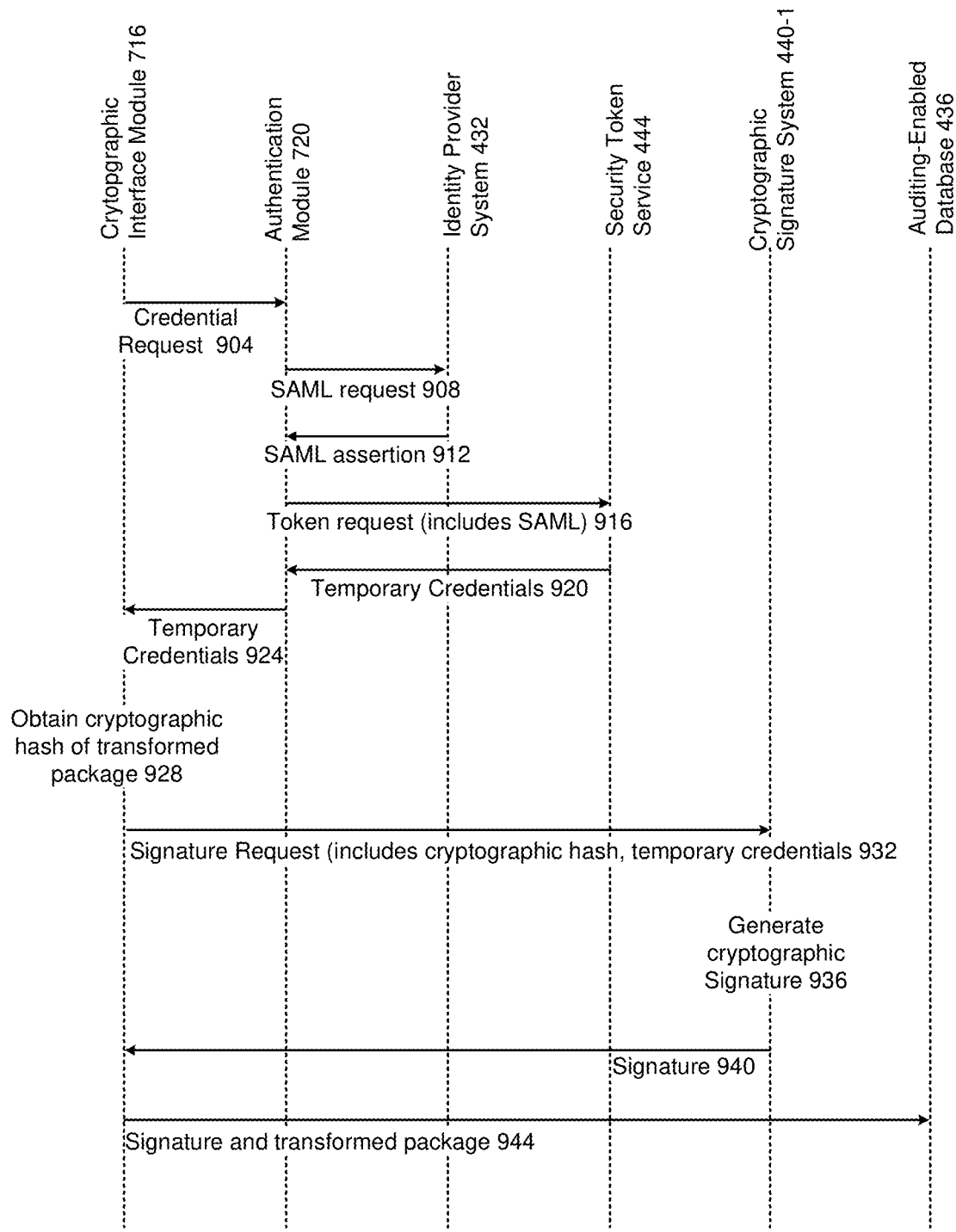
FIG. 9 is a message sequence chart of example operations and data exchange according to the principles of the present disclosure.

In FIG. 9, a message sequence chart illustrates certain data interactions. Beginning at 904, the cryptographic interface module 716 sends a credential request to the authentication module 720. The authentication module 720 then makes a security assertion markup language (SAML) request at 908 to the identity provider system 432. The identity provider system 432 establishes the authenticity of authentication module 720 and, at 912, provides a SAML assertion back to the authentication module 720.

The authentication module 720 then, at 916, sends a token request to the security token service 444. The token request includes the SAML assertion. The security token service 444 confirms the validity of the SAML assertion and, upon successful verification, provides temporary credentials back to the authentication module 720 at 920. The authentication module 720 then provides the temporary credentials to the cryptographic interface module 716 at 924.

At 928, assuming the provided temporary credentials are valid, the cryptographic interface module 716 generates a cryptographic hash of a transformed package. The cryptographic hash may have been generated by the cryptographic digest module 712 prior to, during, or after receiving the temporary credentials at 924. With the cryptographic hash and the temporary credentials, the cryptographic interface module 716 transmits the signature request to the cryptographic signature system 440-1 at 932.

Upon successful verification of the temporary credentials, the cryptographic signature system 440-1 generates a cryptographic signature at 936. The cryptographic signature system 440-1 transmits the signature back to the cryptographic interface module 716 at 940. At 944, the cryptographic interface module 716 sends the signature to the database 436 and also sends the transformed package and/or the data package. In various implementations, the cryptographic interface module 716 also provides the cryptographic hash to the database 436.

Figure 10:
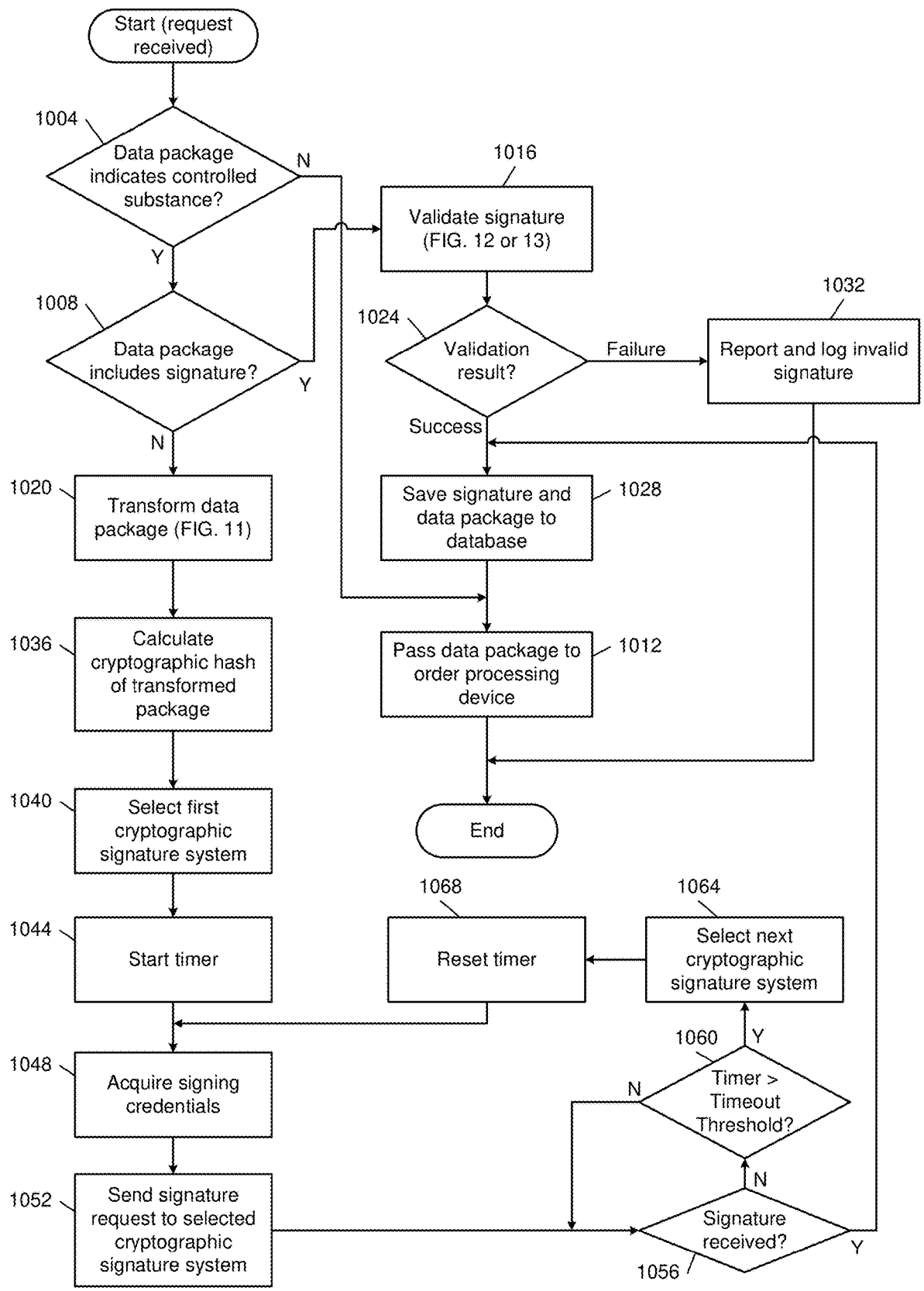
FIG. 10 is a flowchart of example operation of the data package management module.

In FIG. 10, a flowchart depicts example operation, such as what might be performed by the signature management module 508. Control begins at 1004, where control determines whether the data package includes an indication that a controlled substance is implicated. If so, control transfers to 1008; otherwise, control transfers to 1012. At 1012, control passes the data package to the order processing device and control ends. Meanwhile, at 1008, the data package indicates a controlled substance and control determines whether a signature is included in the data package. If so, control transfers to 1016; otherwise, control transfers to 1020.

In various implementations, the signature may include or be part of a certificate, such as a certificate compliant with X.509. At 1016, control validates the signature, such as by using a process according to FIG. 12 or FIG. 13. Control continues at 1024 where, if the validation result was a success, control transfers to 1028; if the validation result is a failure, control transfers to 1032. At 1032, control reports the invalid signature and creates a log entry. Control then ends. At 1028, control saves the signature and the data package to a data store, such as the database 436. Control continues at 1012, where the data package is passed to the order processing device.

At 1020, control transforms the data package into a transformed package. For example, this transformation may be performed using transformation rules stored in the transformation rules data source 708 of FIG. 7 and may follow operations described in more detail in FIG. 11. At 1036, control calculates a cryptographic hash of the transformed package.

At 1040, control selects a first one of the cryptographic signatures systems. In the event that there is only a single cryptographic signature system, this selection is straightforward. When there are multiple cryptographic signature systems, control may initially select a cryptographic signature system designated as primary. At 1044, control starts a timer. At 1048, control acquires signing credentials for the selected cryptographic signature system. At 1052, control sends a signature request to the selected cryptographic signature system and presents the signing credentials.

At 1056, control determines whether a signature has been received. If so, control transfers to 1028; otherwise, control transfers to 1060. In various implementations, once the signature is received, control may instead transfer to 1016 for validation of the received signature. At 1060, control determines whether the timer exceeds a timeout threshold. If so, this may indicate unresponsiveness of the selected cryptographic signature system (for example, due to a failure of a cloud hosting region including the selected cryptographic signature system) and therefore control transfers to 1064; otherwise, control returns to 1056. At 1064, control selects the next cryptographic signature system. In the case where there is only a single cryptographic signature system, the selection at 1064 is skipped. Control continues at 1068, where the timer is reset and control continues at 1048.

Figure 11:
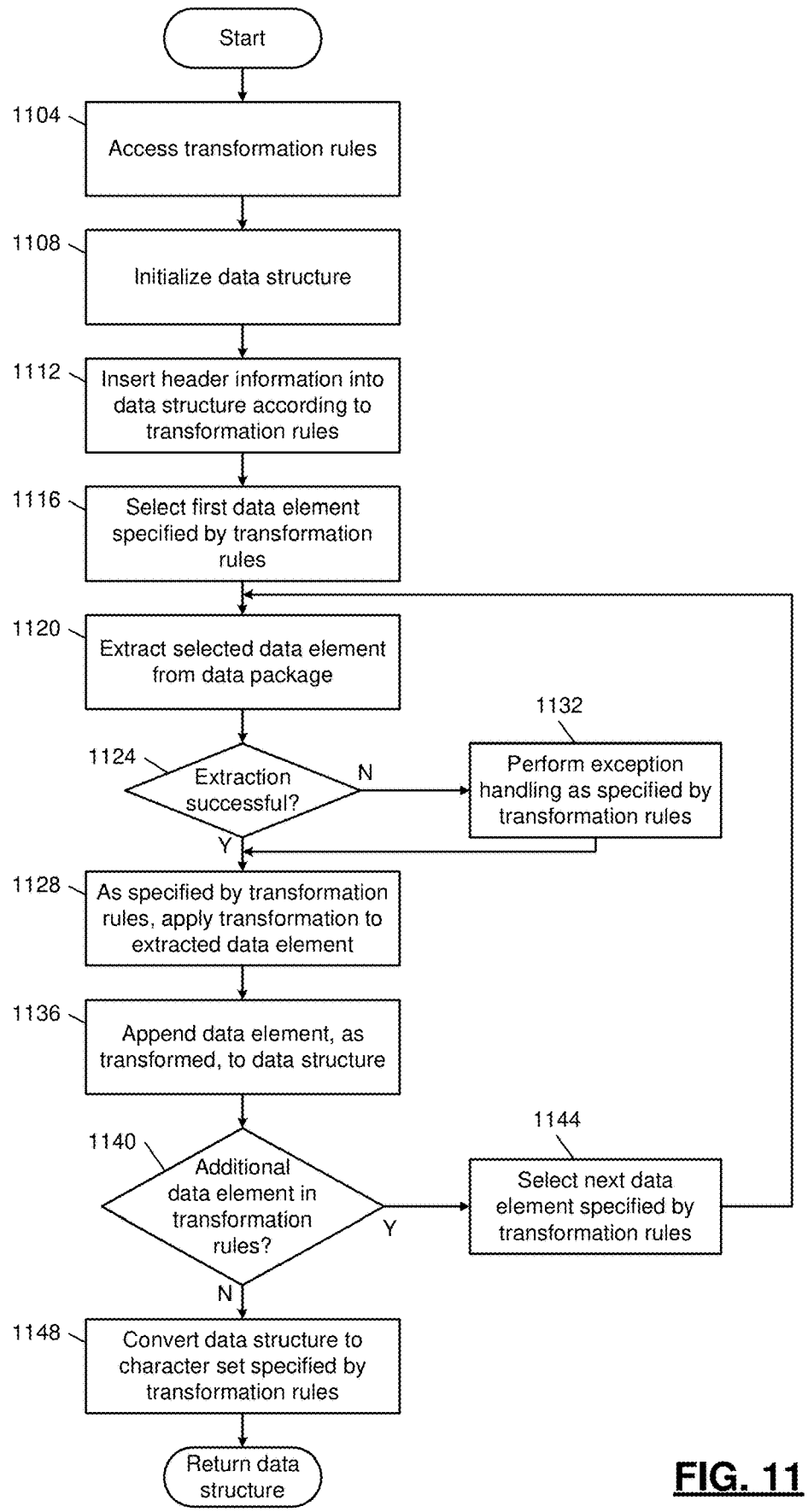
FIG. 11 is a flowchart of example operation for transforming a data package.

FIG. 11 shows an example of transformation according to a particular framework of transformation rules. Control begins at 1104, where control accesses transformation rules. The transformation rules may be accessed according to a type of the data package to be processed. In other implementations, the transformation rules are the same regardless of the type of data package.

At 1108, control initializes a data structure, such as a character array, a byte array, a string, a linked list, etc. At 1112, control inserts header information into the header structure according to the transformation rules accessed at 1104. At 1116, control selects a first data element specified by the transformation rules. At 1120, control extracts the selected data element from the data package. In various implementations, the extraction may also include validation, such as checking whether the data element is within bounds, contains acceptable characters, or otherwise satisfies a set of satisfaction criteria. At 1124, if the extraction is successful (including, if validation was performed, that the validation was successful), control transfers to 1128; otherwise, control transfers to 1132.

At 1132, control performs exception handling. In various implementations, the exception handling may be specified by transformation rules. For example, the transformation rules may specify that a certain data element being out of bounds results in the data package failing such that no transformation is possible. Another example of a transformation rule is to replace a value that is higher than an upper threshold with the upper threshold. Another example of a transformation rule may be to create a default value if no value is specified by the data package. The default value may be a constant or may be determined based on context, such as data contained in the data package or other data such as current time of day, etc. If the exception handling doesn't end creation of the transformed package, control continues at 1128.

At 1128, control selectively applies a transformation to an extracted data element. This transformation is dictated by the transformation rules. In various implementations, no transformations are specified by the transformation rules and, in certain implementations, the framework for transformation rules may be configured not to even support individual data element transformation. An example of transformation may be from an unsigned integer to a signed integer, from a string to a character array, from one date or time format to another, etc. Further, the transformation may specify that certain characters are removed and/or replaced. For example, certain reserved characters may be escaped by pre-pending them with a pre-defined escape character.

At 1136, control inserts the data element as transformed to the data structure. For example, control may add the transformed data element to the end of the data structure (that is, appending the transformed data element). At 1140, control determines whether the transformation rules specify any additional data elements for inclusion. If so, control transfers to 1144; otherwise, control transfers to 1148. At 1144, control selects the next data element specified by the transformation rules and returns to 1120. In various implementations, the order of the data elements may be as shown in the above table from the top row to the bottom row.

In various implementations, when appending the data element at 1136, control may include a section heading at the beginning of the appended data element. For example, using the above table as an example, when the patient's last name is appended to the data structure, the string <patient> within angled brackets may be appended just prior to appending the patient's last name. Further, each field may be delimited by, for example, a field identifier, such as <LastName>, to indicate the patient's last name. In various implementations, the field identifier may precede the field. In various implementations, the field identifier may be combined with a length indicator that specifies how long the field will be in bytes, characters, etc.

At 1148, control converts the data structure to a character set specified by the transformation rules. For example, the specified character set may be the American Standard Code for Information Interchange (ASCII). For example, these ASCII characters may be restricted to 8 bit values—a character set of up to 256 characters. Control then returns the data structure as the transformed package.

Figure 12:
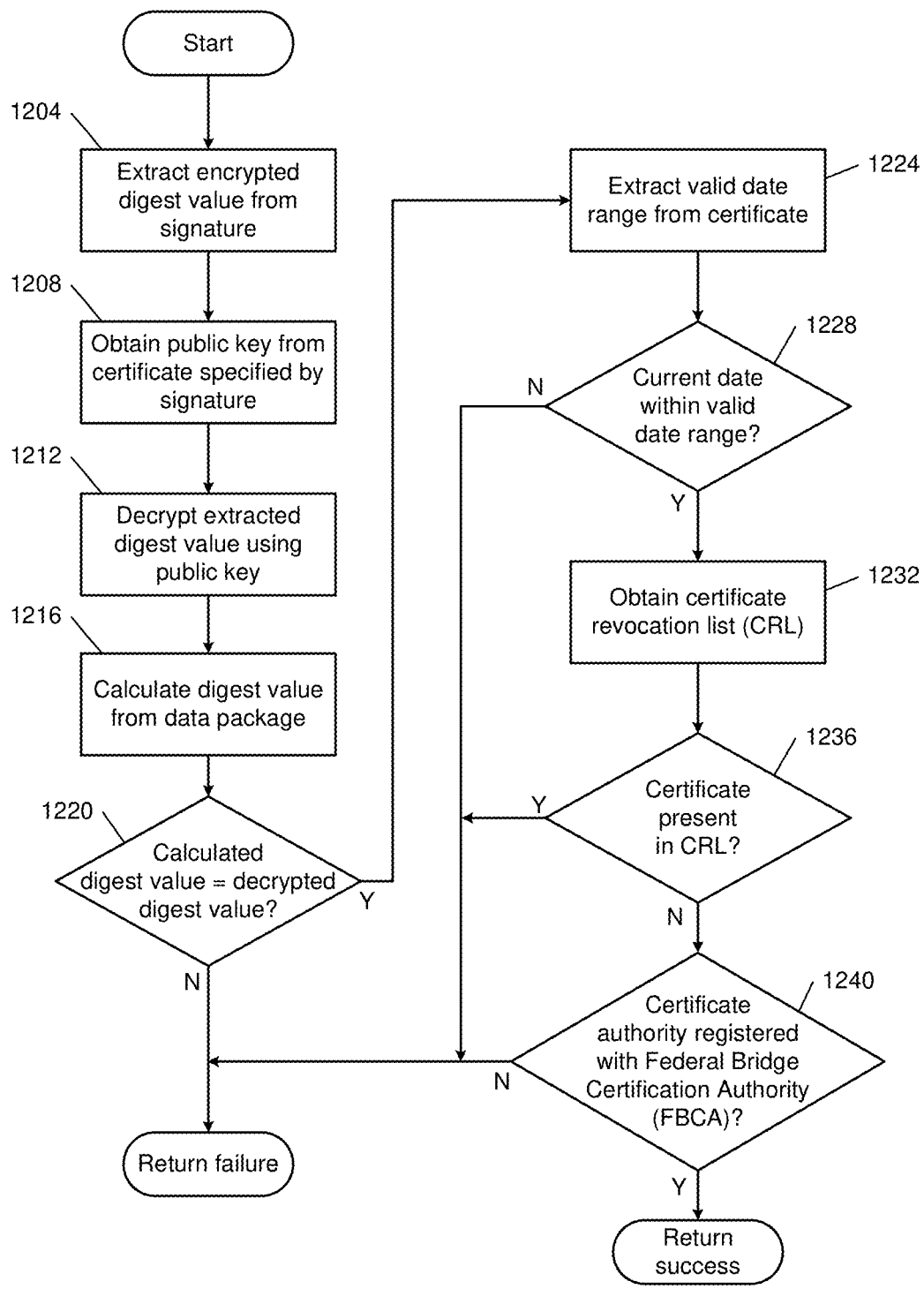
FIG. 12 is a flowchart of example operation of signature validation.

In FIG. 12, example signature validation is presented. Control begins at 1204, where control extracts an encrypted digest value from the signature. At 1208, control obtains a public key from a certificate specified by the signature. At 1212, control decrypts the extracted digest value using the public key. At 1216, control calculates the digest value from the data package. At 1220, control determines whether the calculated digest value is equal to the decrypted digest value. If so, control transfers to 1224; otherwise, validation fails and control returns a failure indicator.

At 1224, control extracts a date range indicating the validity of the certificate. At 1228, if the current date is within the valid date range, control transfers to 1232, otherwise control returns a failure indicator. At 1232, control obtains a Certificate Revocation List (CRL). At 1236, control determines whether the certificate is present in the CRL. If so, control returns a failure indicator; otherwise, control continues at 1240. At 1240, control determines whether the certificate authority is registered with the Federal Bridge Certification Authority (FBCA). If so, control returns a success indicator; otherwise, control returns a failure indicator.

Figure 13:
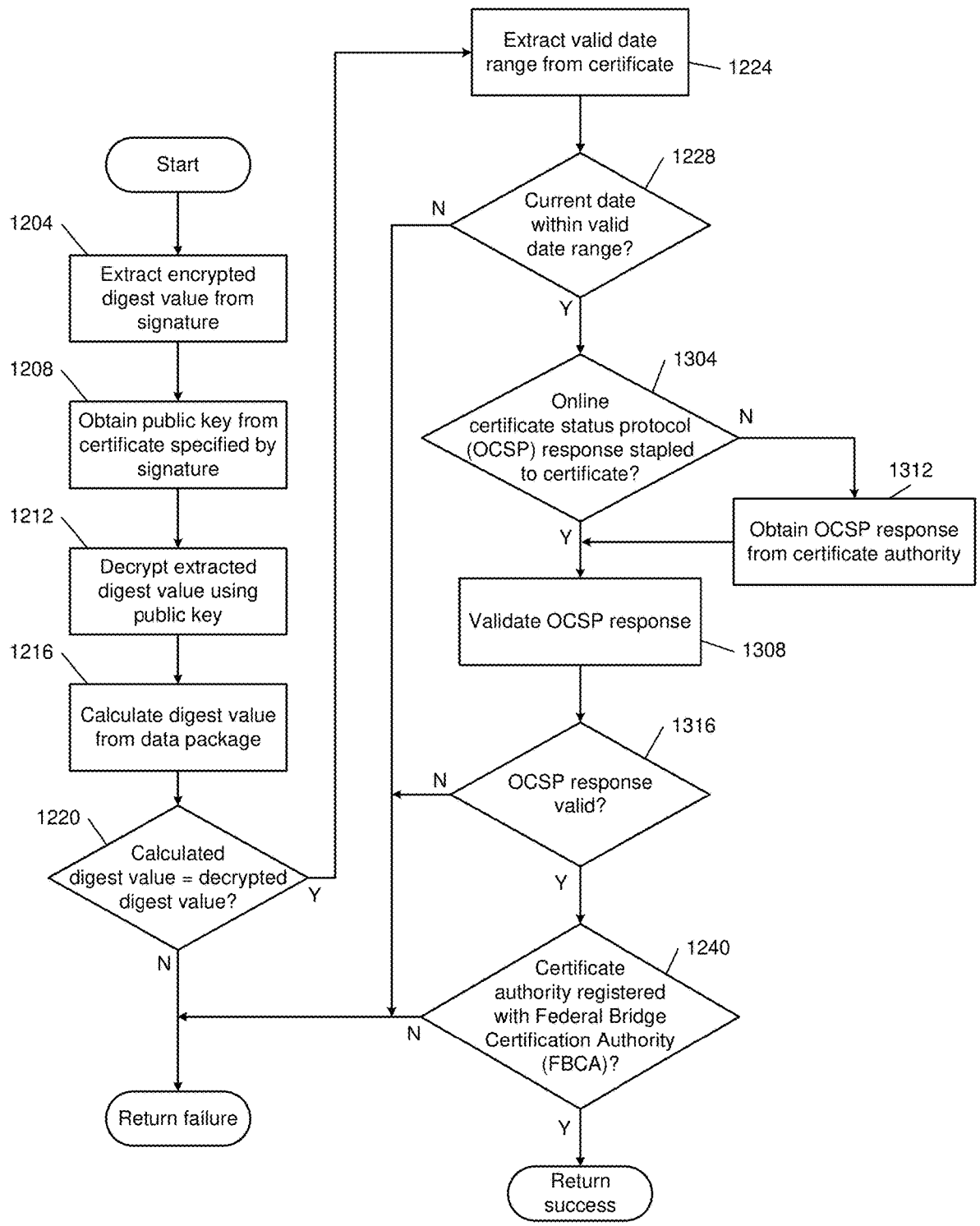
FIG. 13 is a flowchart of a further example of signature validation operation.

In FIG. 13, another example signature validation process is presented. Certain elements of FIG. 13 may be similar to those of FIG. 12 and this similarity is indicated by reusing the reference numerals from FIG. 12. If, at 1228, the current date is within the valid date range, control transfers to 1304. At 1304, control determines whether an Online Certificate Status Protocol (OCSP) response is stapled to the certificate. If so, control transfers to 1308; otherwise, control transfers to 1312.

At 1312, control requests and obtains an OCSP response from the certificate authority. In various implementations, if the OCSP response is not received within a predetermined amount of time, control may return a failure indicator. Once the OCSP response is obtained, control continues at 1308. At 1308, control validates the OCSP response. At 1316, if the validation is successful, control transfers to 1240; otherwise, if the OCSP response is not valid, control returns a failure indicator.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The present disclosure described flags in record or flagging a record in a database. A flag can be a field in record in which a value can be set to indicate a characteristic of the record. The value can be a digital value: for example, a binary entry. The flag can have two or more values. In the example of a record relating to a prescription, the flag can indicate whether or not a prescription record requires a cryptographic signature. In the example of the record relating to a prescription, the flag can also indicate whether the cryptographic signature has been requested and whether the cryptographic signature has been received and associated with the correct record. In another example, the flags can be stored in a separate record with the status of the flag being associated with the appropriate record.

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cryptographic protection system comprising:
memory hardware configured to store instructions; and
processing hardware configured to execute the instructions stored by the memory hardware, wherein the instructions include:
receiving a data package via a networked communications channel;
determining whether the data package includes a cryptographic signature;
in response to a determination that the data package includes the cryptographic signature, validating the cryptographic signature;
in response to a determination that a set of conditions has been met, wherein the set of conditions includes a first condition that is met when the data package does not include the cryptographic signature and a second condition that is met when a type of the data package matching one of an enumerated set of types:
in response to determining that the data package is a first type, selecting a first set of transformation rules,
in response to determining that the data package is a second type, selecting a second set of transformation rules,
in response to determining that the data package is a third type, selecting a third set of transformation rules,
transforming the data package into a transformed package according to the selected transformation rules, wherein the transforming includes:

identifying a plurality of data elements in the data package as specified by the selected transformation rules, determining, based on the selected transformation rules, whether a first data element of the plurality of data elements requires removal, in response to a determination that the first data element of the plurality of data elements requires removal, removing the first data element from the plurality of data elements, and based on the type of the data package, inserting each of the plurality of data elements into a specified data structure in the transformed package, executing a cryptographic hash on the transformed package to generate a cryptographic digest, and obtaining the cryptographic signature based on the cryptographic digest; and storing the cryptographic signature in a data store.

2. The cryptographic protection system of claim 1 wherein the enumerated set of types includes a new prescription type, a renewal response type, a denied response type, and a change response type.

3. The cryptographic protection system of claim 1 wherein the storing includes storing the data package into the data store.

4. The cryptographic protection system of claim 1 wherein obtaining the cryptographic signature includes:

requesting temporary credentials; and transmitting a signature request to a cryptographic signature system, wherein the signature request includes the temporary credentials and the cryptographic digest.

5. The cryptographic protection system of claim 4 wherein:

the cryptographic protection system is operated by a first party; and the cryptographic signature system is operated by a third party.

6. The cryptographic protection system of claim 5 wherein obtaining the cryptographic signature includes:

obtaining first credentials from an identity provider system operated by the first party; and presenting the first credentials to a security token service operated by the third party to obtain the temporary credentials.

7. The cryptographic protection system of claim 4 wherein obtaining the cryptographic signature includes, in response to unresponsiveness of the cryptographic signature system, transmitting a second signature request to a second cryptographic signature system.

8. The cryptographic protection system of claim 1 wherein the set of conditions includes a third condition that is met when the data package includes information indicating a controlled substance.

9. The cryptographic protection system of claim 1 wherein the transforming includes, for each data element of the plurality of data elements, selectively applying a transformation to the data element according to the selected transformation rules.

10. The cryptographic protection system of claim 1 wherein the instructions include, in response to determining that the data package is a fourth type, selecting a fourth set of transformation rules.

11. The cryptographic protection system of claim 1 wherein the transforming includes converting every character of the transformed package into a defined set of characters.

12. A method of operating a cryptographic protection system, the method comprising:

receiving a data package via a networked communications channel;

determining whether the data package includes a cryptographic signature;

in response to a determination that the data package includes the cryptographic signature, validating the cryptographic signature;

in response to a determination that a set of conditions has been met, wherein the set of conditions includes a first condition that is met when the data package does not include the cryptographic signature and a second condition that is met when a type of the data package matching one of an enumerated set of types:

in response to determining that the data package is a first type, selecting a first set of transformation rules, in response to determining that the data package is a second type, selecting a second set of transformation rules, in response to determining that the data package is a third type, selecting a third set of transformation rules, transforming the data package into a transformed package according to the selected transformation rules, wherein the transforming includes:

identifying a plurality of data elements in the data package as specified by the selected transformation rules, determining, based on the selected transformation rules, whether a first data element of the plurality of data elements requires removal, in response to a determination that the first data element of the plurality of data elements requires removal, removing the first data element from the plurality of data elements, and based on the type of the data package, inserting each of the plurality of data elements into a specified data structure in the transformed package, executing a cryptographic hash on the transformed package to generate a cryptographic digest, and obtaining the cryptographic signature based on the cryptographic digest; and storing the cryptographic signature in a data store.

13. The method of claim 12 wherein obtaining the cryptographic signature includes:

requesting temporary credentials; and transmitting a signature request to a cryptographic signature system, wherein the signature request includes the temporary credentials and the cryptographic digest.

14. The method of claim 13 wherein:

the cryptographic protection system is operated by a first party;

the cryptographic signature system is operated by a third party; and obtaining the cryptographic signature includes:

obtaining first credentials from an identity provider system operated by the first party; and presenting the first credentials to a security token service operated by the third party to obtain the temporary credentials.

15. The method of claim 12 wherein the transforming includes, for each data element of the plurality of data elements, selectively applying a transformation to the data element according to the selected transformation rules.

16. The method of claim 12 further comprising in response to determining that the data package is a fourth type, selecting a fourth set of transformation rules.

17. The method of claim 12 wherein the transforming includes converting every character of the transformed package into a defined set of characters.

18. A non-transitory computer-readable storage medium comprising instructions including:
receiving a data package via a networked communications channel;
determining whether the data package includes a cryptographic signature;
in response to a determination that the data package includes the cryptographic signature, validating the cryptographic signature;
in response to a determination that a set of conditions has been met, wherein the set of conditions includes a first condition that is met when the data package does not include the cryptographic signature and a second condition that is met when a type of the data package matching one of an enumerated set of types:
  in response to determining that the data package is a first type, selecting a first set of transformation rules,
  in response to determining that the data package is a second type, selecting a second set of transformation rules,
  in response to determining that the data package is a third type, selecting a third set of transformation rules,
transforming the data package into a transformed package according to the selected transformation rules, wherein the transforming includes:
  identifying a plurality of data elements in the data package as specified by the selected transformation rules,
  determining, based on the selected transformation rules, whether a first data element of the plurality of data elements requires removal,
  in response to a determination that the first data element of the plurality of data elements requires removal, removing the first data element with a second data element in the plurality of data elements, and
  based on the type of the data package, inserting each of the plurality of data elements into a specified data structure in the transformed package,
executing a cryptographic hash on the transformed package to generate a cryptographic digest, and
obtaining the cryptographic signature based on the cryptographic digest; and
storing the cryptographic signature in a data store.

19. The non-transitory computer-readable storage medium of claim 18 wherein the instructions include, in response to determining that the data package is a fourth type, selecting a fourth set of transformation rules.

20. The non-transitory computer-readable storage medium of claim 18 wherein the transforming includes converting every character of the transformed package into a defined set of characters.

* * * * *